(12) United States Patent
Barr et al.

(10) Patent No.: US 7,055,044 B2
(45) Date of Patent: May 30, 2006

(54) SYSTEM AND METHOD FOR VOLTAGE MANAGEMENT OF A PROCESSOR TO OPTIMIZE PERFORMANCE AND POWER DISSIPATION

(75) Inventors: Andrew H. Barr, Roseville, CA (US); Ricardo Espinoza-Ibarra, Carmichael, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 536 days.

(21) Appl. No.: 10/216,232

(22) Filed: Aug. 12, 2002

(65) Prior Publication Data

US 2004/0030938 A1    Feb. 12, 2004

(51) Int. Cl.
  *G06F 1/26* (2006.01)
  *G06F 1/32* (2006.01)
(52) U.S. Cl. .................. 713/300; 713/310; 713/320
(58) Field of Classification Search ............... 713/300, 713/310, 320
  See application file for complete search history.

(56) References Cited

U.S. PATENT DOCUMENTS

| | | | | |
|---|---|---|---|---|
| 6,141,762 A * | 10/2000 | Nicol et al. | ................. | 713/300 |
| 6,253,269 B1 * | 6/2001 | Cranston et al. | ............ | 710/107 |
| 6,411,506 B1 * | 6/2002 | Hipp et al. | ................. | 361/686 |
| 6,836,849 B1 * | 12/2004 | Brock et al. | ................. | 713/310 |
| 2002/0147932 A1 | 10/2002 | Brock et al. | | |
| 2003/0065960 A1 * | 4/2003 | Rusu et al. | ................. | 713/300 |

FOREIGN PATENT DOCUMENTS

| | | |
|---|---|---|
| DE | 19600210 | 7/1996 |
| EP | 991191 | 3/2001 |
| EP | 978781 | 4/2003 |
| EP | 1182548 | 10/2003 |
| EP | 1182552 | 10/2003 |
| WO | WO 03/014902 | 2/2003 |
| WO | WO 03/027820 | 4/2003 |

OTHER PUBLICATIONS

Microsoft Computer Dictionary, Fifth Edition, 2002, p. 489.*
Search Report issued on Dec. 19, 2003 in counterpart foreign application in GB under application No. 315095.0.

* cited by examiner

*Primary Examiner*—Lynne H. Browne
*Assistant Examiner*—Stefan Stoynov (57) ABSTRACT

A method includes receiving an input signal, which contains instructions for modulating a voltage of a blade, generating a control signal, which is determined by the instructions contained in the input signal, generating an output voltage, and providing the output voltage to the blade. A system includes receiving means for receiving an input signal, first generating means for generating a control signal, second generating means for generating an output voltage, and first providing means for providing the output voltage to the blade.

27 Claims, 5 Drawing Sheets

SYSTEM AND METHOD FOR VOLTAGE MANAGEMENT OF A PROCESSOR TO OPTIMIZE PERFORMANCE AND POWER DISSIPATION

CROSS-REFERENCE TO RELATED APPLICATIONS

This application is related to U.S. patent application Ser. No. 10/216,437, entitled "SYSTEM, METHOD AND APPARATUS FOR THE FREQUENCY MANAGEMENT OF BLADES IN A BLADED ARCHITECTURE BASED ON PERFORMANCE REQUIREMENTS" to Andrew H. BARR, et al.; U.S. patent application Ser. No. 10/216,438, entitled "SYSTEM AND METHOD FOR FREQUENCY MANAGEMENT OF COMPUTER SYSTEMS TO ALLOW CAPACITY ON DEMAND" to Andrew H. BARR, et al.; U.S. patent application Ser. No. 10/216,283, entitled "SYSTEM, METHOD AND APPARATUS FOR PERFORMANCE OPTIMIZATION AT THE PROCESSOR LEVEL" to Ricardo ESPINOZA-IBARRA, et al.; U.S. patent application Ser. No. 10/216,234, entitled "SYSTEM AND METHOD FOR LOAD DEPENDENT FREQUENCY AND PERFORMANCE MODULATION IN BLADED SYSTEMS" to Ricardo ESPINOZA-IBARRA, et al.; U.S. patent application Ser. No. 10/216,284, entitled "VOLTAGE MANAGEMENT OF BLADES IN A BLADED ARCHITECTURE BASED ON PERFORMANCE REQUIREMENTS" to Andrew H. BARR, et al.; U.S. patent application Ser. No. 10/216,286, entitled "VOLTAGE MODULATION IN CONJUNCTION WITH PERFORMANCE OPTIMIZATION AT PROCESSOR LEVEL" TO Andrew H. BARR, et al.; U.S. patent application Ser. No. 10/216,285, entitled "SYSTEM AND METHOD FOR MANAGING THE OPERATING FREQUENCY OF PROCESSORS OR BLADES" to Ricardo ESPINOZA-IBARRA, et al.; U.S. patent application Ser. No. 10/216,229, entitled "SYSTEM AND METHOD FOR MANAGING THE OPERATING FREQUENCY OF BLADES IN A BLADED-SYSTEM" to Ricardo ESPINOZA-IBARRA, et al.; U.S. patent application Ser. No. 10/216,233, entitled "VOLTAGE MANAGEMENT OF PROCESSORS IN A BLADED SYSTEM BASED ON LOADING" to Andrew H. BARR, et al., and U.S. patent application Ser. No. 10/216,435, entitled "MANAGEMENT OF A MEMORY SUBSYSTEM" to Andrew H. BARR, et al., all of which are concurrently herewith being filed under separate covers, the subject matters of which are herein incorporated by reference.

BACKGROUND

Bladed servers are computing systems that provision servers or other computer resources on individual cards, or blades. There are many types of blades—server blades, storage blades, network blades, processor blades, etc. The blades of a server are typically housed together in a single structure, creating high-density systems with a modular architecture that ensures flexibility and scalability. Thus, bladed servers reduce space requirements. Server blades, along with storage, networking and other types of blades, are typically installed in a rack-mountable enclosure, or chassis, that hosts multiple blades that share common resources such as cabling, power supplies, and cooling fans.

The telecommunications industry has been using bladed server technology for many years. The condensed server bladed architecture also benefits people and businesses that use the Internet to generate revenues and provide services to customers, that are moving some of their business processes to the Web, and that need the flexibility to deploy Internet-edge applications in their own data center. Because of recent developments in technology, bladed servers are now used for applications such as web hosting, web caching and content streaming. Web caching, for example, stores frequently requested Web content closer to the user so objects can be retrieved more quickly, thereby reducing the time and the bandwidth required to access the Internet. Companies and individuals are now streaming media, such as video, audio, and interactive, in order to more effectively communicate both internally and externally. This has led to a massive growth of rich media content delivery on the Internet. Bladed servers are being used to meet these new demands.

Bladed servers, however, create challenging engineering problems, due largely in part to heat produced by the blades and limited space in the chassis. Typically, bladed server systems are limited by an underlying power and thermal envelope. For example, a chassis that hosts a bladed system may only be designed to utilize a limited number of watts. That is, the chassis can only can consume so much power and is limited in the amount of airflow that is available to cool the blades in the chassis.

Engineering challenges occur in optimizing the tradeoff between performance and thermal and power requirements. In a bladed architecture multiple blades, each representing a separate system, are present in the same chassis. Associated with the chassis are a specific set of power and thermal requirements. Specifically, these requirements put a limit on the amount of power that can be consumed by the respective blades.

Known power limiting strategies include powering down a CPU functional unit, e.g., a floating-point unit or an on-die cache, or trading off speed for reduced power consumption in a hard drive. Power limitations also put a constraint on the frequency that the processors on the blade can run, and thus, limits the performance. In addition, the processors in a system are usually all configured to operate at the same frequency. This further limits the ability for the individual processors to operate at optimal performance and capacity.

Prior solutions run all the blades at a performance level less than their maximum in order to meet the overall chassis power and thermal cooling budget. A disadvantage associated with this solution is that the performance of each blade is degraded or diminished to fall within these budgets. For example, if the ability of the chassis to cool is limited to X and there are Y blades, each blade can only contribute approximately X/Y to the dissipated power in the chassis. Thus, each blade is limited to the performance associated with an X/Y power level.

Another solution has been to add a plurality of loud, space-consuming fans that require expensive control circuitry. These cooling systems increase the cost of the server blade system, leave less space for other features within the chassis for other features, and run a higher risk for failures and increased downtime. Other solutions have included limiting the number of I/O cards in the system, as well as restricting the number of other use features. A further solution has been to reduce the power budget available for other features in the system.

What is needed is a method for modulating the frequency and voltage of a blade in a bladed architecture system in accordance with the performance demands of the individual blade and the overall system power and thermal budget of the system.

SUMMARY

The method and system of the present application are advantageous in providing means to change a voltage of a processor in a multi-processor system or a bladed architecture based on performance requirement of the processor.

These and other advantages are found, for example, in a method that includes receiving an input signal. The input signal contains instructions for modulating a voltage of a blade. The method also includes generating a control signal. The information contained in the control signal is determined by the instructions contained in the input signal. The method further includes generating an output voltage based on the control signal and providing the output voltage to the blade.

These and other advantages are also found, for example, in a system that includes receiving means for receiving an input signal. The input signal comprises instructions for modulating a voltage of a blade. The system also includes first generating means for generating a control signal. The control contains information determined by the instructions contained in the input signal. The system further includes second generating means for generating an output voltage based on the control signal. The system also includes first providing means for providing the output voltage to the blade.

These and other advantages are further found, for example, in a system that includes a user interface, which receives an input signal. The input signal comprises instructions for modulating a voltage of a blade and is defined by a user. The system also includes an Inter-IC bus and an input/output expander, which receives the input signal from the Inter-IC bus and generates a control signal. The control signal comprises information determined by the instructions contained in the input signal. They system further includes a DC-to-DC converter, which generates an output voltage based on information contained in the control signal and provides the output voltage to the blade.

These and other advantages are also found, for example, in a system that includes a serial presence detect circuit, which computes an output voltage based on an optimal performance level of a blade and generates an input signal. The input signal comprises instructions for modulating a voltage of a blade. The system also includes an Inter-IC bus and an input/output expander, which receives the input signal from the Inter-IC bus and generates a control signal. The control signal comprises information determined by the instructions contained in the input signal. The system further includes a DC-to-DC converter, which generates the output voltage based on information contained in the control signal and provides the output voltage to the blade.

These and other advantages are further found, for example, in a system that includes a manual configuration device, which provides an input signal. The input signal comprises instructions for modulating a voltage of a blade and is defined by a user. The manual configuration device also generates a control signal. The control signal comprises information determined by the instructions contained in the input signal. The system also includes a DC-to-DC converter, which generates an output voltage based on information contained in the control signal and provides the output voltage to the blade.

These and other advantages are also found, for example, in a system that includes a user interface, which receives an input signal. The input signal comprises instructions for modulating a voltage of a blade and is defined by a user. The system also includes an Inter-IC bus and a microprocessor, which receives the input signal from the Inter-IC bus and generates a control signal. The control signal comprises information determined by the instructions contained in the input signal. The system further includes a DC-to-DC converter, which generates an output voltage based on information contained in the control signal and provides the output voltage to the blade.

These and other advantages are further found, for example, in a system that includes a user interface, which receives an input signal. The input signal comprises instructions for modulating a voltage of a blade and is defined by a user. The system also includes an Inter-IC bus and a microcontroller, which receives the input signal from the Inter-IC bus and generates a control signal. The control signal comprises information determined by the instructions contained in the input signal. The system further includes a DC-to-DC converter, which generates an output voltage based on information contained in the control signal and provides the output voltage to the blade.

These and other advantages are also found, for example, in a system that includes a user interface, which receives an input signal. The input signal comprises instructions for modulating a voltage of a blade and is defined by a user. The system also includes an Inter-IC bus and a field programmable gate array, which receives the input signal from the Inter-IC bus and generates a control signal. The control signal comprises information determined by the instructions contained in the input signal. The system further includes a DC-to-DC converter, which generates an output voltage based on information contained in the control signal and provides the output voltage to the blade.

These and other advantages are further found, for example, in a system that includes a user interface, which receives an input signal. The input signal comprises instructions for modulating a voltage of a blade and is defined by a user. The system also includes an Inter-IC bus and a programmable logic device, which receives the input signal from the Inter-IC bus and generates a control signal. The control signal comprises information determined by the instructions contained in the input signal. The system further includes a DC-to-DC converter, which generates an output voltage based on information contained in the control signal and provides the output voltage to the blade.

DESCRIPTION OF THE DRAWINGS

The detailed description will refer to the following drawings, wherein like numerals refer to like elements, and wherein.

DETAILED DESCRIPTION

Figure 1:
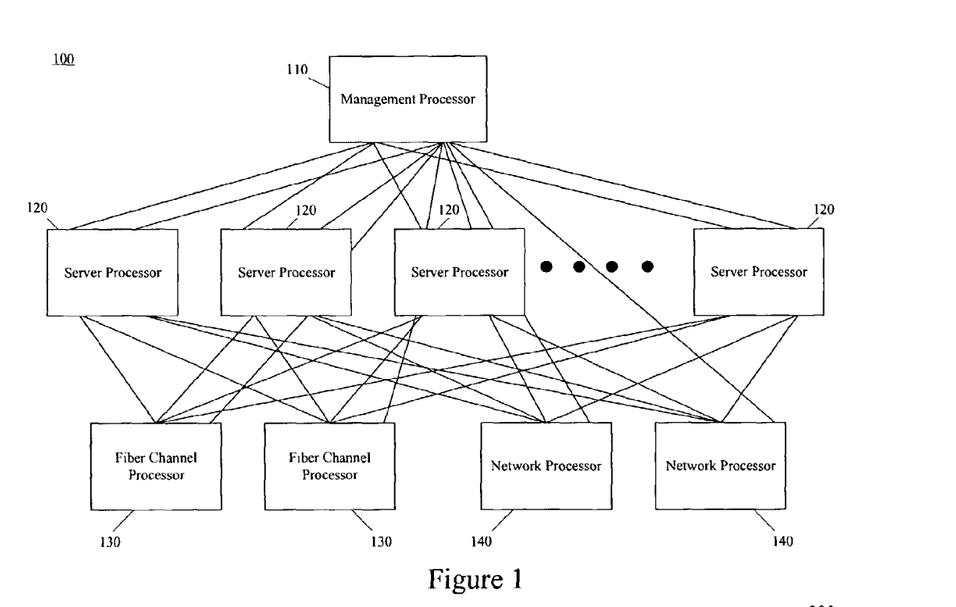
FIG. 1 shows a block diagram depicting one embodiment of the basic modular building blocks of a bladed architecture system.

The preferred embodiments of the system and method for voltage management of a processor to optimize performance and power dissipation will now be described in detail with reference to the following figures, in which like numerals refer to like elements. FIG. 1 illustrates a block diagram depicting one embodiment of the basic modular building blocks of a bladed architecture system, as generally designated by the reference numeral 100. A management blade 110 supervises the functions of the chassis and provides a single interface to the consoles of all the servers installed. As shown in FIG. 1, server blades 120 are in communication with the management blade 110. The server blades 120 are, in turn, in communication with other blades that perform specific functions. For example, as seen in the FIGURE, server blades 120 are in communication with fiber channel blades 130 and network blades 140. It is to be appreciated that the various blades in a bladed architecture system 100 may be server blades, network blades, storage blades or storage interconnect blades, etc. In general, blades of the same type (server, fibre channel, network, etc.) contain the same hardware and software components, although the different blades may be running at a different voltage or frequency than other blades of the same type.

By taking advantage of a blade's application requirements for higher or lower performance, each blade is allowed to run at an increased/decreased voltage and frequency and thus consume more or less of the chassis thermal and power budget. Management blades 110 that run processes that require a higher level of performance are run at a higher voltage and frequency and thus consume more of the chassis's thermal and power budget. Slave blades 120 that run background processes that require a lower level of performance are run at a lower voltage and frequency and thus consume less of the chassis's thermal and power budget. In either scenario, the overall thermal and power requirements of bladed architecture system 100 are still met with a more optimal overall blade performance.

As discussed above, it is desirous to create a bladed architecture system 100 in which it is possible to adjust the voltage of the blades 110, 120, 130, 140 individually. In one embodiment, the voltage and the frequency of a particular blade, or processor within that blade, are adjusted simultaneously. One skilled in the art will appreciate that techniques described herein for modifying the voltage of a processor can also be used to modify the voltage used by the blade in which that processor is hosted. In general, as the voltage of a processor is increased (within a specific range) the frequency at which the processor can run also increases. Conversely, as the voltage of the processor is decreased, the frequency at which the processor can run decreases. Thus, when the frequency of the processor in a blade is decreased because a lower level of performance is required, the voltage may also be decreased with the frequency, providing a large thermal and power relief. Because the power dissipated by the processor in a blade is proportional to the frequency and square of the voltage, modulating the voltage provides a large additional benefit over just modulating the frequency.

In many bladed architecture systems 100 the voltage that a processor or memory runs off of is generated by a voltage converter called a DC-to-DC converter. The DC-to-DC converter takes in a global system power that operates all servers within a chassis, for example five volts, and from that global system power generates the specific voltage requirement for the individual blades 110, 120, 130, 140 hosted within the chassis. The DC-to-DC converter is typically controlled using an ASIC as the central controller within a circuit. The modulation of the voltage to blades 110, 120, 130, 140 can be accomplished by providing a serial or parallel digital input to "trim" pins on the DC-to-DC converter. By making small changes in a value at a given trim pin in the DC-to-DC converter circuit, the output voltage can be slightly increased or decreased. For example, two volts can be changed to 2.1, 2.2 volts, etc. FIGS. 2–5 illustrate different methodologies of the how the input to the trim pins of the DC-to-DC converter can be controlled.

Figure 2:
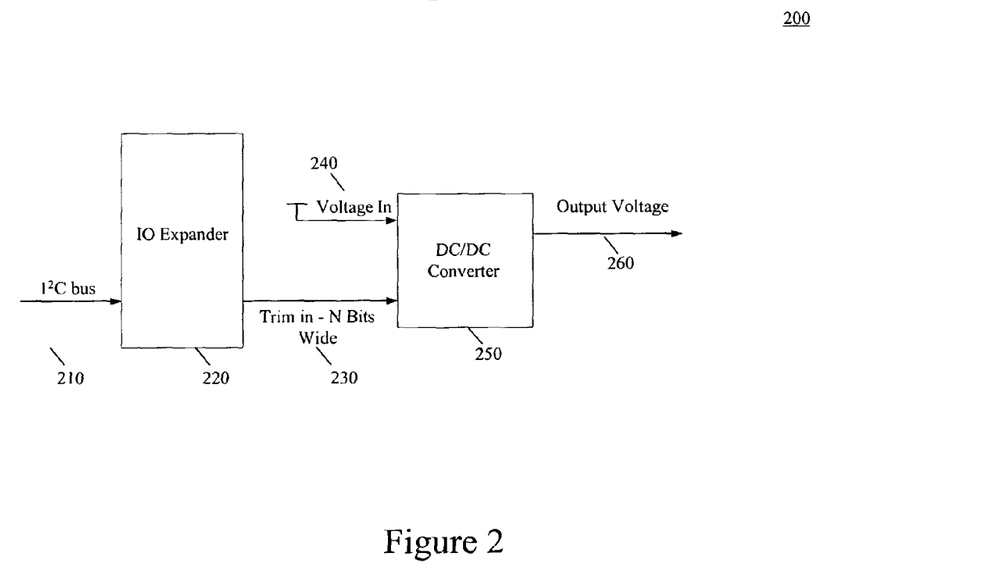
FIG. 2 illustrates a block diagram depicting one methodology of managing the operating voltage of individual blades by use of an input/output expander chip.

FIG. 2 illustrates a block diagram depicting an embodiment of a method of managing the operating voltage of individual blades, or processors within that blade, by use of an Inter-IC ($I^2C$) device, such as an Input/Output (I/O) expander chip, as generally designated by the reference numeral 200. $I^2C$ method 200 includes: providing a control signal from $I^2C$ bus 210; providing the control signal to an I/O expander chip 220; generating a "trim in" signal 230; providing a "voltage in" signal 240; providing the "voltage in" signal 240 to trim pins of a DC-to-DC converter 250; and generating an output voltage 260.

An $I^2C$ bus 210, or other control bus, is used to control I/O expander chip 220. As is known to those skilled in the art, $I^2C$ bus 210 is a bi-directional two-wire serial bus that provides a communication link between integrated circuits. In one embodiment, where blades 110, 120, 130, 140 are a PA-RISC blade, control signals are provided to $I^2C$ bus 210 manually using a Guardian Service Processor (GSP) console. GSP is a management consol allows user control of various parameters of bladed architecture system 100, for example, the voltage being provided to a particular blade 110, 120, 130, 140 or processor hosted within bladed architecture system 100. The user-friendly interface of the GSP console allows the user to manually control the voltage of the blades 110, 120, 130, 140 within bladed architecture system 100 without requiring knowledge of any low-level information, such as bit-settings.

In another embodiment, control signals are provided to $I^2C$ bus 210 automatically using serial presence detect (SPD) functionality. SPD is a serial bus that queries different parts of bladed architecture system 100 to determine the loading status of optionally loaded features. These optionally loaded features include, for example, blades 110, 120, 130, 140 or any other board. Bladed architecture system 100 can automatically detect the appropriate voltage for each blade 110, 120, 130, 140 that would maximize the performance of that blade 110, 120, 130, 140 within the thermal and power limits of bladed architecture system 100. SPD utilizes $I^2C$ bus 210 to query all blades 110, 120, 130, 140 in bladed architecture system 100 to determine how many blades are loaded with the chassis of bladed architecture system 100, to determine the performance requirement for the blades 110, 120, 130, 140, etc. The information is then used to automatically modulate the voltage provided to blades 110, 120, 130, 140.

I/O expander chip 220 can be an inexpensive serial-to-parallel type of chip that is controlled using $I^2C$ bus 210. I/O expander chip 220 has input/output (I/O) ports that are forced to a particular state by writing to I/O expander chip 220 through an $I^2C$ command. Since I/O expander chip 220 is $I^2C$ based, I/O expander chip 220 can be controlled by any device that supports an I²C interface, such as a GSP or SPD, as described previously. I/O expander chip 220 typically has multiple I/O ports. Therefore, one I/O expander chip 220 can be used to control multiple DC-to-DC converters 250 individually. I/O expander chip 220 generates "trim in" signal 230, an N bits wide control signal that is input to the trim pins of DC-to-DC converter 250. The "trim in" signal 230 contains information regarding voltage modulation from the user. The "trim in" signal 230 is provided to DC-to-DC converter 250 to provide an appropriate input into the trim pins of DC-to-DC converter 250 to control the voltage of the blades 110, 120, 130, 140. The "voltage in" signal 240 is also provided to DC-to-DC converter 250 in order to provide a reference voltage level against which the blade voltage is compared. The reference voltage level represents the global system power of bladed architecture systems 100, the maximum voltage accessible by any one blade 110, 120, 130, 140 hosted within bladed architecture system 100. DC-to-DC converter 250 then generates the appropriate output voltage 260 for the blades 110, 120, 130, 140 to optimize performance of the blades 110, 120, 130, 140 within the thermal and power limitations of the bladed architecture system 100. The output voltage 260 is applied to the various blades 110, 120, 130, 140 using the trim pins on DC-to-DC converter 250.

Figure 3:
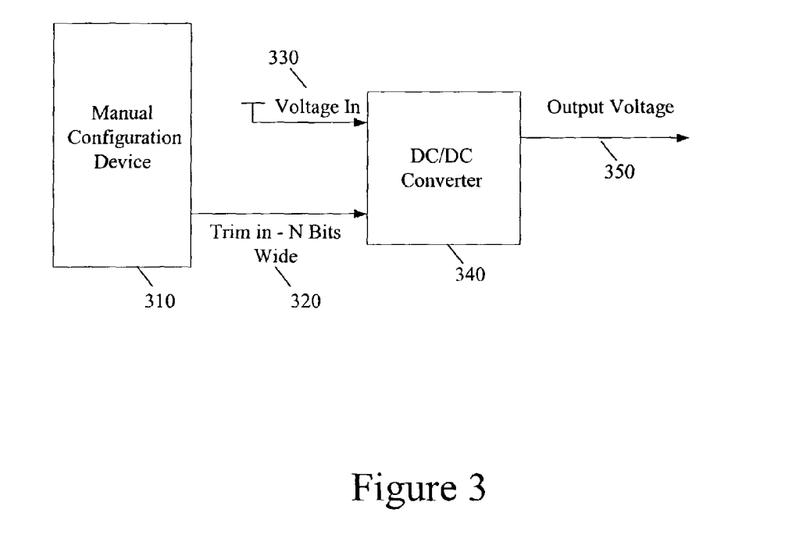
FIG. 3 illustrates a block diagram depicting an embodiment of a method of managing the operating voltage of individual blades by use of a manual configuration device.

FIG. 3 illustrates a block diagram depicting an embodiment of a method of managing the operating voltage of individual blades, or processors within that blade, by use of a manual configuration device, as generally designated by the reference numeral 300. Manual configuration device method 300 includes: setting manual configuration device 310 on the bladed architecture system 100, generating a "trim in" signal 320; providing a "voltage in" signal 330; providing the "voltage in" signal 330 to trim pins of a DC-to-DC converter 340; and generating an output voltage 350.

One of ordinary skill in the art would recognize that there are many common manual configuration devices that are capable of performing the desired function, e.g., dip switches, jumpers installed over pin headers, rotational configuration switches, and solder bridges, etc. For example, in one embodiment, dip switches may be used as the manual configuration device 310. As known in the art, dip switches are a series of tiny switches built into circuit boards, for example, the circuit boards that comprise the blades 110, 120, 130, 140.

Manual configuration device 310 enables the user to configure the blades. In the present embodiment, the manual configuration device 310 allows the user to modulate the voltage being used by a particular blade 110, 120, 130, 140. The manual configuration device 310 may be added to a physically readily accessible part of bladed architecture system 100, such as on an exterior portion of bladed architecture system 100. Thus, the user, or operator, is allowed to manually set the voltage of the blades 110, 120, 130, 140 upon reboot of the bladed architecture system 100, based on predetermined performance requirements. However, the user is required to know the appropriate settings of the configuration bits of the trim pins of DC-to-DC converter 450.

Manual configuration device 310 generates "trim in" signal 320, an N bits wide control signal that is input to the trim pins of DC-to-DC converter 340. The "trim in" signal 320 contains information regarding voltage modulation from the user. The "trim in" signal 320 is provided to DC-to-DC converter 340 to provide an appropriate input into the trim pins of DC-to-DC converter 340 to control the voltage of the blades 110, 120, 130, 140. The "voltage in" signal 330 is also provided to DC-to-DC converter 340 in order to provide a reference voltage level against which the blade voltage is compared. The reference voltage level represents the global system power of bladed architecture systems 100, the maximum voltage accessible by any one blade 110, 120, 130, 140 hosted within bladed architecture system 100. DC-to-DC converter 340 then generates the appropriate output voltage 350 for the blades 110, 120, 130, 140 to optimize performance of the blades 110, 120, 130, 140 within the thermal and power limitations of the bladed architecture system 100. The output voltage 350 is applied to the various blades 110, 120, 130, 140 using the trim pins of DC-to-DC converter 340.

Figure 4:
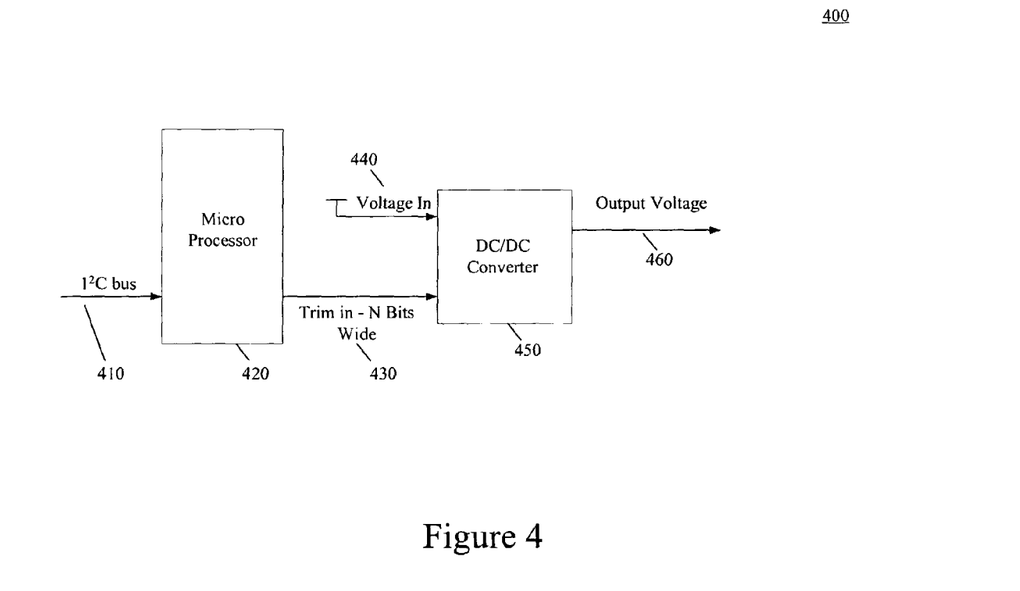
FIG. 4 illustrates a block diagram depicting an embodiment of a method of managing the operating voltage of individual blades by use of a microcontroller or microprocessor.

FIG. 4 illustrates a block diagram depicting an embodiment of a method of managing the operating voltage of individual blades, or processors within that blade, by use of a microprocessor/microcontroller, as generally designated by the reference numeral 400. Microprocessor method 400 includes: providing a control signal from I²C bus 410; providing the control signal to a microprocessor/microcontroller 420; generating a "trim in" signal 430; providing a "voltage in" signal 440; providing the "voltage in" signal 440 to trim pins of a DC-to-DC converter 450; and generating an output voltage 460.

An I²C bus 410 is used to control microprocessor/microcontroller 420. As is known in the art, I²C bus 410 is a bi-directional two-wire serial bus that provides a communication link between integrated circuits. Microprocessor/microcontroller 420 is interfaced with the user using I²C bus 410 to allow the user to input the voltage at which the user wants to run the blades 110, 120, 130, 140. User input can be accomplished using a higher-level interface device, for example, a console. Microprocessor/microcontroller 420 can be programmed to automatically convert the user input into the appropriate commands to modulate the voltage of the blades 110, 120, 130, 140 without requiring the user to know the appropriate settings of the configuration bits of the trim pins of DC-to-DC converter 450.

Microprocessor/microcontroller 420 generates "trim in" signal 430, an N bits wide control signal that is input to the trim pins of DC-to-DC converter 450. The "trim in" signal 430 contains information regarding voltage modulation from the user. The "trim in" signal 430 is provided to DC-to-DC converter 450 to provide an appropriate input into the trim pins of DC-to-DC converter 450 to control the voltage of the blades 110, 120, 130, 140. The "voltage in" signal 440 is also provided to DC-to-DC converter 450 in order to provide a reference voltage level against which the blade voltage is compared. The reference voltage level represents the global system power of bladed architecture systems 100, the maximum voltage accessible by any one blade 110, 120, 130, 140 hosted within bladed architecture system 100. DC-to-DC converter 450 then generates the appropriate output voltage 460 for the blades 110, 120, 130, 140 to optimize performance of the blades 110, 120, 130, 140 within the thermal and power limitations of the bladed architecture system 100. The output voltage 460 is applied to the various blades 110, 120, 130, 140 using the trim pins of DC-to-DC converter 450.

Figure 5:
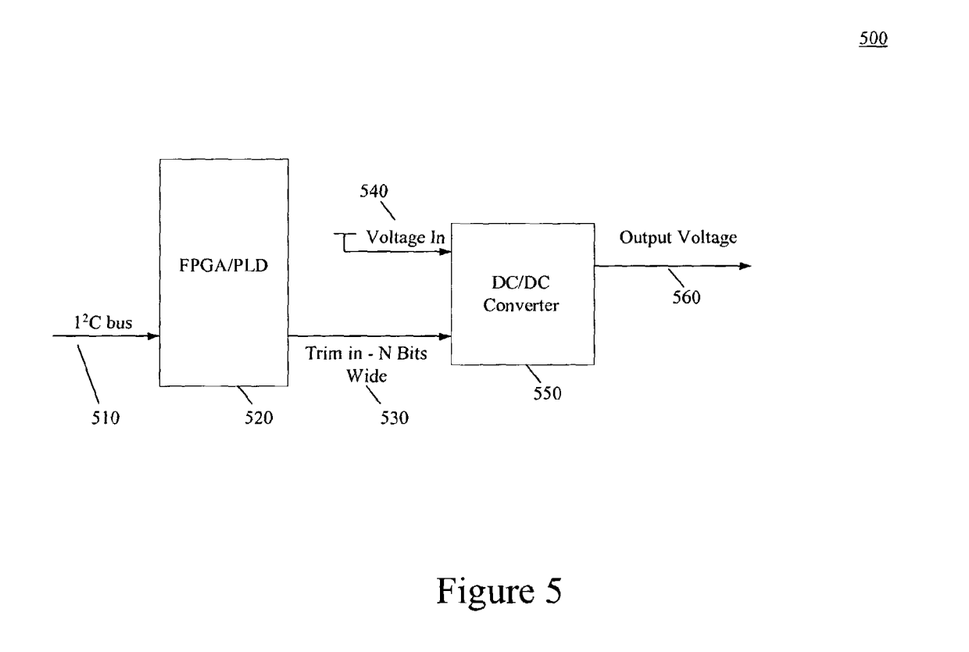
FIG. 5 illustrates a block diagram depicting an embodiment of a method of managing the operating voltage of individual blades by use of a field programmable gate array or programmable logic device.

FIG. 5 illustrates a block diagram depicting an embodiment of a method of managing the operating voltage of individual blades, or processors within that blade, by use of a field-programmable gate array (FPGA) or programmable logic device (PLD), as generally designated by the reference numeral 500. FPGA/PLD method 500 includes: providing a control signal from I²C bus 510; providing the control signal to an FPGA/PLD 520; generating a "Trim in" signal 530; providing a "voltage in" signal 540; providing the "voltage in" signal 540 to trim pins of a DC-to-DC converter 550; and generating an output voltage 560.

An $I^2C$ bus 510 is used to control FPGA/PLD 520. As is known to those skilled in the art, $I^2C$ bus 510 is a bi-directional two-wire serial bus that provides a communication link between integrated circuits. As known to those skilled in the art, a FPGA is a chip is a particular type of PLD that can be programmed in the field after manufacture. The FPGA/PLD 520 is interfaced with the user using $I^2C$ bus 410 to allow the user to input the voltage at which the user wants to run the blades 110, 120, 130, 140. User input can be accomplished using a higher-level interface device, for example, a console. Like the use of microcontroller/microprocessor 420 described with reference to FIG. 5, FPGA/PLD 520 allows the user to control the voltage modulation in a more transparent way, i.e., the user is not required to know the appropriate settings of the configuration bits of the trim pins of DC-to-DC converter 550.

FPGA/PLD 520 generates "trim in" signal 530, an N bits wide control signal that is input to the trim pins of DC-to-DC converter 550. The "trim in" signal 530 contains information regarding voltage modulation from the user. The "trim in" signal 530 is provided to DC-to-DC converter 550 to provide an appropriate input into the trim pins of DC-to-DC converter 550 to control the voltage of the blades 110, 120, 130, 140. The "voltage in" signal 540 is also provided to DC-to-DC converter 550 in order to provide a reference voltage level against which the blade voltage is compared. The reference voltage level represents the global system power of bladed architecture systems 100, the maximum voltage accessible by any one blade 110, 120, 130, 140 hosted within bladed architecture system 100. DC-to-DC converter 550 then generates the appropriate output voltage 560 for the blades 110, 120, 130, 140 to optimize performance of the blades 110, 120, 130, 140 within the thermal and power limitations of the bladed architecture system 100. The output voltage 560 is applied to the various blades 110, 120, 130, 140 using the trim pins of DC-to-DC converter 550.

Figure 6:
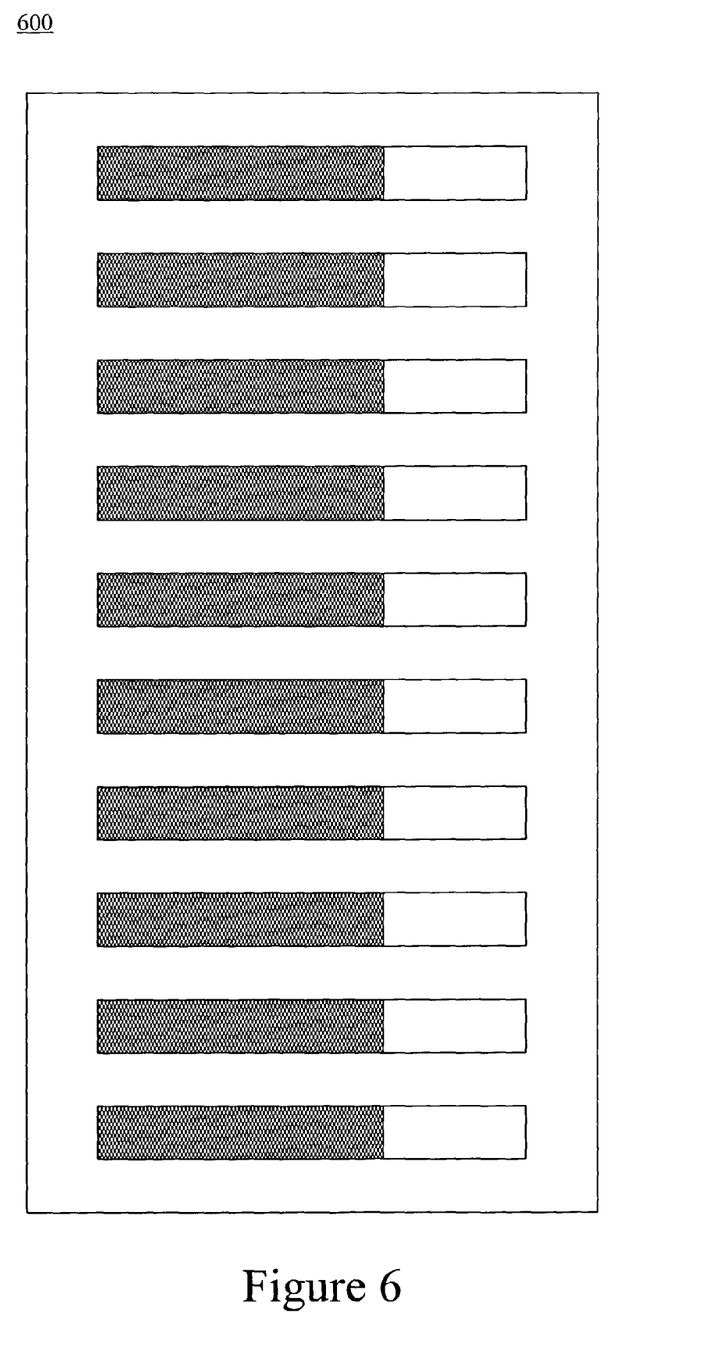
FIG. 6 illustrates a block diagram depicting a series of blades inside of a bladed architecture chassis.

FIG. 6 illustrates a block diagram depicting a series of blades inside of the chassis of bladed architecture system 100 running at the same voltage, as generally designated by the reference numeral 600. The shading of the individual blades indicates that each individual blade is operating at the same voltage level. Operating blades at the same voltage is typical in current bladed architecture system. In addition, the shading illustrates that each blade is operating at below a maximum performance level of that blade in order to remain under the maximum power allocated to the system as a whole. As discussed previously, bladed server systems are limited by an underlying power and thermal envelope. This is due to the heat produced within the blades and to the limited dimensions in the chassis. When the chassis consumes a given amount of the power, the chassis is typically limited in the amount of airflow that is available to cool the blades. As a result, the power limitation limits the voltage that the processors on the blade can run, and thus, limits the performance. Thus, the processors are limited in their ability to operate at optimal performance and capacity, depending on the processes they need to execute, because the processors are configured to operate at the same voltage—a voltage below their maximum level.

Figure 7:
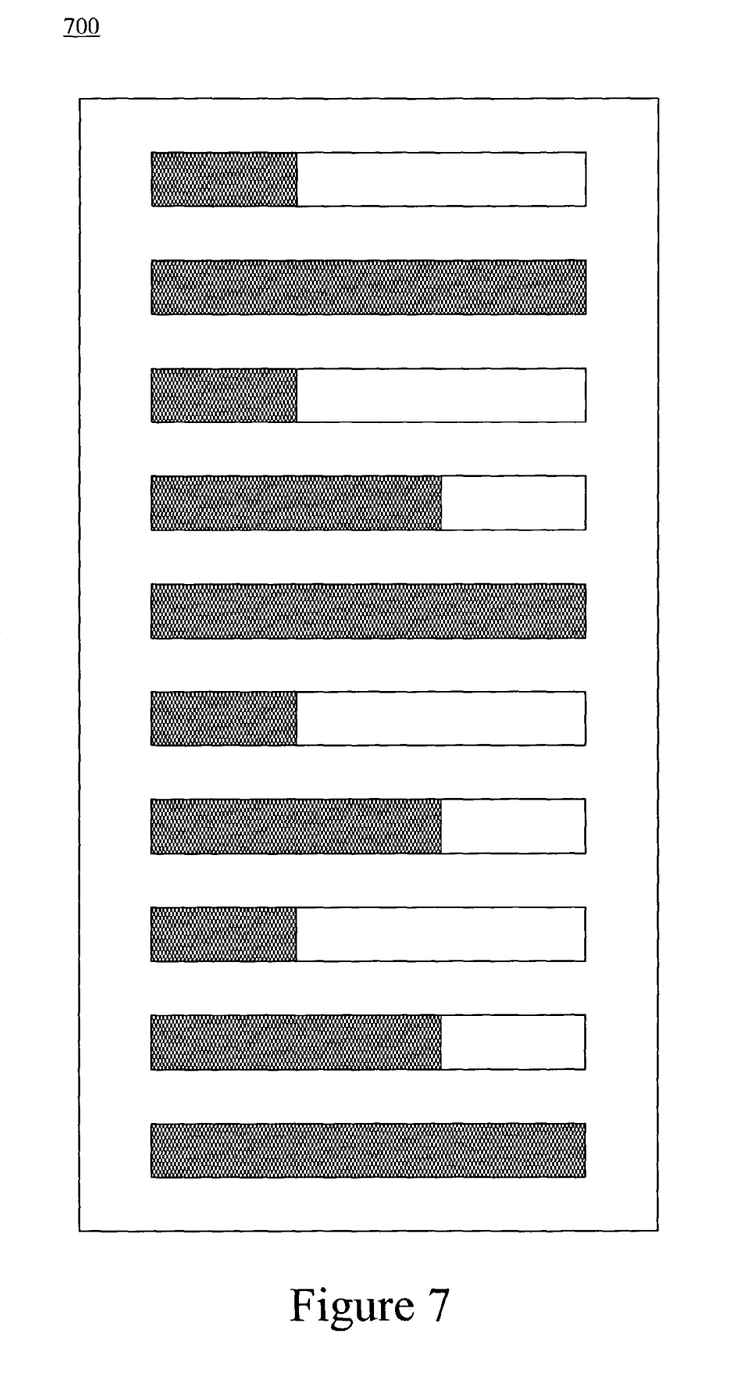
FIG. 7 illustrates a block diagram depicting a series of blades inside of a bladed architecture chassis running at different voltages.

FIG. 7 illustrates a block diagram depicting a series of blades inside of a bladed architecture chassis running at different voltages, as generally designated by the reference numeral 700. The system FIG. 7 represents a system where the user has been able to manually or automatically adjust the voltage levels of the various blades or processors in the chassis using at least one of the various methods described previously. As a result, the overall system runs at a much more efficient level. As seen in the FIGURE, each blade is now only using the requisite voltage level that is required for its particular function within the system. Because of the varying levels of voltage available to the individual blades, blades that require a higher voltage than the average can now operate at a more optimum level. Similarly, blades that require less power no longer require to be run at the same voltage level as the other blades. As a result, a more efficient system is created.

It is to be appreciated that the principles disclosed herein may be applied to a system comprised of processors that share a common chassis or to an architecture system that spans multiple chassis. That is, the principles may be applied to systems that are divided by either a physical or logical partition. For example, physically, a system may include three chassis, with each chassis having eight blades. Logically, the same system could be partitioned into five different web servers for five different customers. Power constraints within a chassis typically concern the physical partition of the system. Power constraints imposed on a customer or application that is located in multiple chassis, typically concern logical partitions. One of ordinary skill in the art would readily recognize that the innovations described above may be applied to both physically and logically partitioned architectures.

While the systems and methods for manually managing the operating voltage of individual blades, or processors, in a blade-based computer system have been described in connection with an exemplary embodiment, those skilled in the art will understand that many modifications in light of these teaching are possible, and this application is intended to cover any variation thereof.

For example, the disclosed system and method makes use of specific $I^2C$ devices that are used to received signals from an $I^2C$ bus. Other $I^2C$ devices could likewise be used. Thus, the devises shown and referenced generally throughout this disclosure, and unless specifically noted, are intended to represent any and all devices/technologies appropriate to perform the desired function. Likewise, there are disclosed several processors and blades that perform various operations. The specific processor or blade is not important to the system and method described herein. Thus, it is not Applicants' intention to limit the system or method described herein to any particular form of processor, blade, or specific blade architecture.

Further examples exist throughout the disclosure, and it is not Applicants' intention to exclude from the scope of this disclosure the use of structures, materials, or acts that are not expressly identified in the specification, but nonetheless are capable of performing a claimed function.

The invention claimed is:

1. A method for voltage management in a multi-processor computer system, said method comprising the steps of:
   receiving an input signal, wherein said input signal contains instructions for modulating voltages of a first blade and a second blade in said multi-processor computer system;
   generating a control signal to modulate the voltages of the first blade and the second blade, wherein information contained in said control signal is determined by said instructions contained in said input signal;

generating a first output voltage for the first blade using a voltage generation circuit based on said control signal;

generating a second output voltage for the second blade using a voltage generation circuit based on said control signal, wherein said first output voltage and said second output voltage are unequal fractions of a total voltage allowance of said multi-processor computer system and wherein said total voltage allowance is determined by a thermal and power budget allocation of said multi-processor computer system;

providing said first output voltage to said first blade; and providing said second output voltage to said second blade, thereby optimizing the performance and power dissipation of said multi-processor computer system.

2. The method according to claim 1, further comprising the steps of:

modulating frequency levels of said first blade and said second blade; and optimizing performance and power dissipation of said multi-processor computer system when said first blade and said second blade operates at the modulated frequency levels.

3. The method according to claim 1, wherein said multi-processor computer system is physically partitioned.

4. The method according to claim 1, wherein said multi-processor computer system is logically partitioned.

5. The method according to claim 1, wherein said first blade is chosen from a group consisting of: a processor blade; a server blade; a network blade; a storage blade; and a storage interconnect blade.

6. The method according to claim 1, wherein said input means is a guardian service processor console.

7. The method according to claim 1, wherein said input means is chosen from a group consisting of: a computer terminal and a manual configuration device.

8. The method according to claim 1, wherein said instructions in said input signal are generated automatically by compute means that computes said first output voltage based on an optimal performance level of said first blade.

9. The method according to claim 8, wherein said compute means is a serial presence detect circuit that queries one or more blades in said multi-processor computer system to determine a corresponding load status for said one or more blades.

10. The method according to claim 1, further comprising a step of providing said input signal to a control circuit, wherein said control circuit generates said control signal.

11. The method according to claim 10, wherein said input signal is provided over an Inter-IC bus.

12. The method according to claim 10, wherein said control circuit is chosen from a group consisting of: an Inter-IC device; an input/output expander; a manual configuration device; a microprocessor; a microcontroller; a field programmable gate array; and a programmable logic device.

13. The method according to claim 1, further comprising a step of providing said control signal to said voltage generation circuit, wherein said voltage generation circuit generates said first output voltage.

14. The method according to claim 13, further comprising a step of providing a reference voltage signal to said voltage generation circuit, wherein said reference voltage signal represents a maximum voltage level accessible by said first blade.

15. The method according to claim 13, wherein said voltage generation circuit is a DC-to-DC converter.

16. A system for voltage management in a multi-processor computer system, said system comprising:

receiving means for receiving an input signal, said input signal comprising instructions for modulating voltages of a first blade and a second blade in said multi-processor computer system;

first generating means for generating a control signal to modulate the voltages of the first blade and the second blade, said control signal containing information determined by said instructions contained in said input signal;

second generating means for generating a first output voltage for the first blade using a voltage generation circuit based on said control signal;

third generating means for generating a second output voltage for the second blade using a voltage generation circuit based on said control signal, wherein said first output voltage and said second output voltage are unequal fractions of a total voltage allowance of said multi-processor computer system and wherein said total voltage allowance is determined by a thermal and power budget allocation of said multi-processor computer system;

first providing means for providing said first output voltage to said first blade; and second providing means for providing said second output voltage to said second blade, thereby optimizing the performance and power dissipation of said multi-processor computer system.

17. The system according to claim 16, further comprising:

a modulating means for modulating frequency levels of said first blade and said second blade; and an optimizing means for optimizing performance and power dissipation of said multi-processor computer system when said first blade and said second blade operates at the modulated frequency levels.

18. The system according to claim 16, wherein said first blade is chosen from a group consisting of: a processor blade; a server blade; a network blade; a storage blade; and a storage interconnect blade.

19. The system according to claim 16, wherein said input means for inputting said instructions is a guardian service processor console.

20. The system according to claim 16, wherein said input means is chosen from a group consisting of a computer terminal and a manual configuration device.

21. The system according to claim 16, wherein said instructions are generated automatically by compute means that computes said output voltage based on an optimal performance level of said first blade.

22. The system according to claim 21, wherein said compute means is a serial presence detect circuit that queries one or more blades in said multi-processor computer system to determine a corresponding load status for said one or more blades.

23. The system according to claim 16, further comprising second providing means for providing said input signal to a control circuit, wherein said control circuit generates said control signal.

24. The system according to claim 23, wherein said input signal is provided over an Inter-IC bus.

25. The system according to claim 23, wherein said control circuit is chosen from a group consisting of: an Inter-IC device; an input/output expander; a manual configuration device; a microprocessor; a microcontroller; a field programmable gate array; and a programmable logic device.

26. The system according to claim 16, further comprising third providing means for providing said control signal to said voltage generation circuit, wherein said voltage generation circuit generates said first output voltage.

27. The system according to claim 26, wherein said voltage generation circuit is a DC-to-DC converter.

* * * * *